United States Patent
Sferrazza et al.

(10) Patent No.: US 6,958,596 B1
(45) Date of Patent: Oct. 25, 2005

(54) COMPENSATION SAMPLE AND HOLD FOR VOLTAGE REGULATOR AMPLIFIER

(75) Inventors: Paul K. Sferrazza, New Hope, PA (US); Stanley F. Wietecha, South Bound Brook, NJ (US)

(73) Assignee: Intersil Americas Inc., Milpitas, CA (US)

( * ) Notice: Subject to any disclaimer, the term of this patent is extended or adjusted under 35 U.S.C. 154(b) by 13 days.

(21) Appl. No.: 10/686,362

(22) Filed: Oct. 15, 2003

Related U.S. Application Data

(60) Provisional application No. 60/435,679, filed on Dec. 20, 2002.

(51) Int. Cl.[7] .................................................. G05F 5/00
(52) U.S. Cl. ........................ 323/303; 323/273; 323/274
(58) Field of Search ................................ 323/303, 272, 323/273, 274

(56) References Cited

U.S. PATENT DOCUMENTS 5,650,715 A * 7/1997 Massie ........................ 323/273
6,545,513 B2 * 4/2003 Tsuchida et al. ............ 327/108

* cited by examiner

*Primary Examiner*—Bao Q. Vu
(74) *Attorney, Agent, or Firm*—Allen, Dyer, Doppelt, Milbrath & Gilchrist, P.A.

(57) ABSTRACT

The problem of charge leakage in the AC compensation filter for the error amplifier of a pulse width modulation (PWM)-based DC—DC converter is effectively obviated by controllably sampling and storing the voltage across the AC compensation filter, in response to a transition of the operation of a DC power supply from run or active mode to quiescent or sleep mode. The sampled voltage is retained as a compensation voltage throughout the quiescent mode, so that it will be immediately available to the PWM circuitry at the termination of the quiescent interval. This serves to ensure a relatively smooth (low noise) power supply switch-over during a subsequent transition from quiescent to active mode.

15 Claims, 2 Drawing Sheets

COMPENSATION SAMPLE AND HOLD FOR VOLTAGE REGULATOR AMPLIFIER

CROSS-REFERENCE TO RELATED APPLICATION

The present application claims the benefit of co-pending U.S. Application Ser. No. 60/435,679, filed Dec. 20, 2002, by P. Sferrazza et al, entitled: "Compensation Sample And Hold For Voltage Regulator Amplifier," assigned to the assignee of the present application and the disclosure of which is incorporated herein.

FIELD OF THE INVENTION

The present invention relates in general to DC power supply circuits and components therefor, and is particularly directed to a circuit arrangement for sampling and holding the voltage across an AC compensation filter installed in a feedback path of a voltage regulator error amplifier for a pulse width modulator, in response to a transition of the operation of a DC power supply from active mode of operation to quiescent mode of operation. By retaining this voltage throughout quiescent mode, the circuit arrangement of the invention is operative to ensure a relatively smooth (low noise) power supply switch-over during a subsequent transition from quiescent to active mode.

BACKGROUND OF THE INVENTION

Electrical power for operating a wide variety of electronic circuit-based products, such as portable and hand-held devices including notebook computers, personal digital assistants, cell phones, and the like, is typically supplied by one or more direct current (DC) power sources, including rechargeable, single-cell batteries. As one would expect, the ongoing demand for increased functionality and longer run time of these battery-powered products has led to the development of power conservation mechanisms, that either sense or are informed that the electronic device is not being actively used, and then take action to reduce power consumption.

As a non-limiting example, the power control circuitry of a laptop computer will customarily transition the computer's power supply from 'active' mode to 'sleep' or 'quiescent' mode of operation, when the user closes the display lid or fails to manipulate an input/output device within some prescribed period time. During this effectively inactive or idle state, an auxiliary power supply within the power control circuitry functions to keep only essential portions of the operational capability of the computer active, so as to minimize power consumption. Subsequently, in response to the user reinitiating use of the device, the power conservation circuit switches back to the main supply, which customarily is configured as a pulse width modulator-based DC—DC converter architecture.

In order to prevent misoperation of the powered device, it is imperative that transitioning between quiescent and active modes be effectively free of power rail anomalies that might otherwise affect the (binary) state of operation of a powered circuit device, such as a memory cell. One circuit where this problem occurs is shown in FIG. 1, which depicts an error amplifier 10 for a pulse width modulator (PWM)-based DC—DC converter having PWM driver circuitry 20 that drives output circuitry 40. The output circuitry typically contains an inductor 41 coupled between the driver 20 and an output node 43 to which a load 45 and a capacitor 47, each referenced to ground (GND) are coupled. The voltage at the output node is fed back, via link 48 to an inverting (−) input 11 of the error amplifier, to the non-inverting (+) input 12 of which an input voltage Vin is coupled.

Link 48 is further coupled the inverting (−) input 51 of an auxiliary, sleep or quiescent mode amplifier 50, to the non-inverting (+) input 52 of which the input voltage Vin is coupled. The output 53 of amplifier 50 is coupled to the output node 43. Error amplifier 10 is enabled by a RUN mode command coupled to its RUN mode enable input 14, while auxiliary amplifier 50 is enabled by a SLEEP mode command coupled to its SLEEP mode enable input 54. The particular area of concern involves an AC compensation RC filter 30 that is customarily installed between the output 13 and an input 11 of error amplifier 10. RC filter 30 may comprise a capacitor 31 and a resistor 32 coupled in circuit between the output 13 and input 11 of error amplifier 10, and a resistor 33 referenced to GND, as shown.

During normal operation or 'RUN'/'ACTIVE' mode, some charge is stored across an RC filter capacitor 31 as the feedback loop through the error amplifier 10 supplies a control input to the PWM driver circuitry 20. When the power supply transitions from active mode to 'SLEEP'/'QUIESCENT' mode, however, this charge begins to bleed off or discharge through the filter's resistor circuitry, as the normal operation of the error amplifier 10 and the PWM circuit 20 is temporarily interrupted. Eventually, when the power supply transitions out of QUIESCENT mode and back into RUN mode, the discharged capacitor 31 will take some finite amount of time to recharge as the PWM driver circuitry 20 is again active. During this interval, the output node 43 provides a voltage that is different from the correct value and appears to downstream powered devices as a power rail anomaly, which can cause misoperation of one or more devices.

SUMMARY OF THE INVENTION

In accordance with the present invention, this problem is effectively obviated by controllably sampling and storing the voltage across the AC compensation filter, in response to a transition of the operation of a DC power supply from run or active mode to quiescent or sleep mode. This sampled voltage is retained as a compensation voltage throughout the quiescent mode, so that it will be immediately available to the PWM circuitry at the termination of the quiescent interval. This serves to ensure a relatively smooth (low noise) power supply switch-over during a subsequent transition from quiescent to active mode.

Pursuant to a non-limiting embodiment, the sample and hold circuit may comprise a binary counter, respective stages of which are coupled to associated current mirror stages of a multistage current mirror, which is referenced to a bandgap voltage. The current mirror's output currents are combined in a summing resistor to produce a summation voltage that is coupled one input of a 'compensation' differential amplifier. A second input of the compensation amplifier is coupled to a compensation node COMP, to which the AC compensation filter of the error amplifier is coupled. Combinational logic combines outputs of respective stages of the counter to provide an output to the control input of a sample and hold switch that is installed in a feedback path of the compensation amplifier.

In response to a run-to-sleep mode transition of the power supply circuit, the compensation amplifier and the counter are enabled, with the counter being sequentially incremented by a clock signal. As the counter is clocked, associated current mirror stages of the multistage current mirror sequentially increment the magnitude of current being summed through the summing resistor. When the summed currents produce a voltage across this resistor that equals the value of the compensation voltage at the compensation pin COMP, the output of the compensation amplifier changes stage, freezing the count value in the counter. This also places the compensation amplifier in a unity gain mode, so that the voltage at the compensation pin COMP is held at its current value. Upon returning to RUN mode, this maintained compensation voltage is immediately available to the PWM circuitry, so that a smooth transition between sleep and run mode is provided.

DETAILED DESCRIPTION

Before describing a non-limiting, but preferred embodiment of the sample and hold-based, voltage compensation circuit of the present invention, it should be observed that the invention resides primarily in an arrangement of conventional circuit components, and the manner in which they may be incorporated into a PWM-controlled DC—DC converter of the type described above. It is to be understood that the present invention may be embodied in a variety of other implementations, and should not be construed as being limited to only the embodiment shown and described herein. Rather, the implementation example shown and described here is intended to supply only those specifics that are pertinent to the present invention, so as not to obscure the disclosure with details that are readily apparent to one skilled in the art having the benefit of present description. Throughout the text and drawings like numbers refer to like parts.

Figure 1:
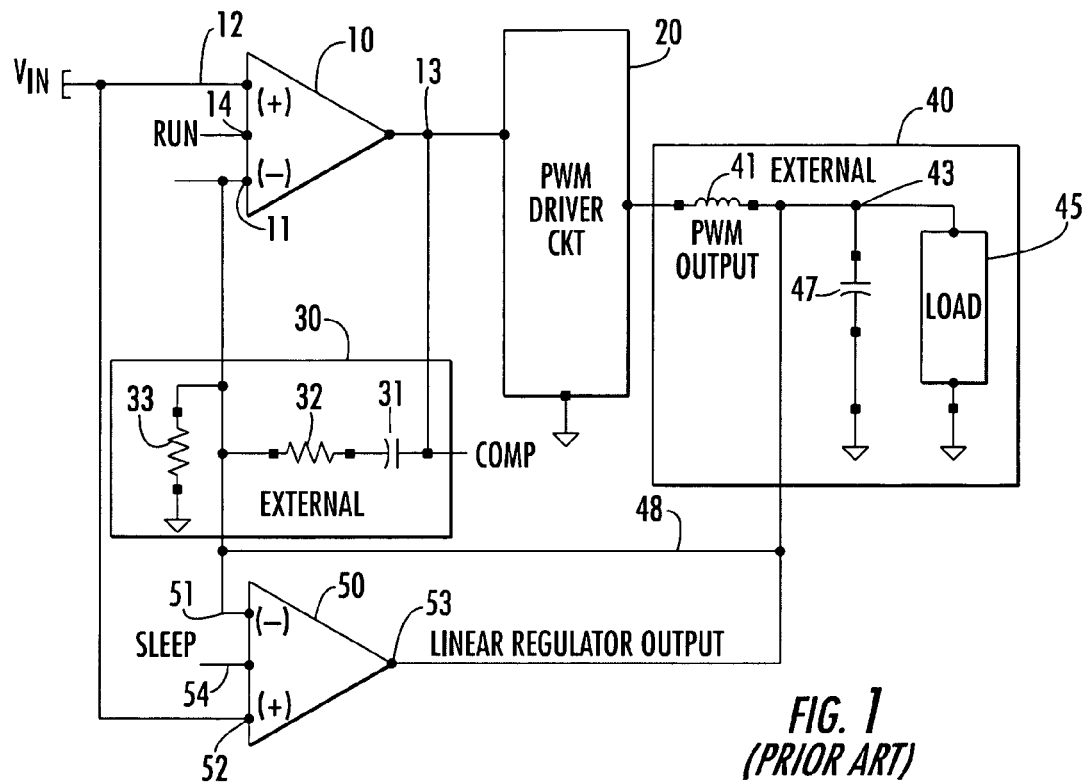
FIG. 1 diagrammatically illustrates a conventional configuration of a pulse width modulator (PWM)-based DC—DC converter having an AC compensation RC filter coupled with the converter's error amplifier.
Figure 2:
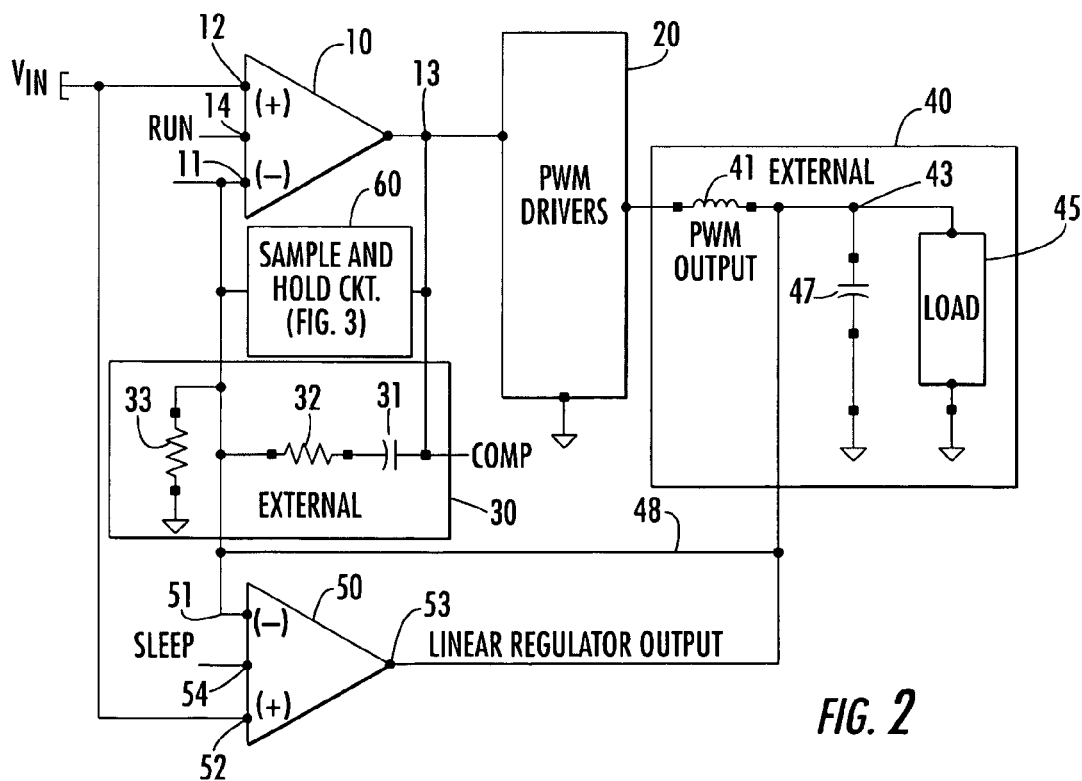
FIG. 2 diagrammatically illustrates a modification of the modulator (PWM)-based DC—DC converter of FIG. 1 to incorporate a sample and hold-based, voltage compensation circuit of the present invention.

As pointed out briefly above, and as diagrammatically shown in FIG. 2, the present invention controllably places a sample and hold compensation circuit 60 in parallel with the AC compensation filter 30, in response to a transition of the operation of a DC power supply from RUN mode to SLEEP mode. This sampled voltage is then retained as a compensation voltage throughout SLEEP mode, so that it may be immediately available to the PWM driver circuitry 20 at the termination of the SLEEP interval. This serves to ensure a relatively smooth (low noise) power supply switch-over during a subsequent transition from SLEEP to RUN mode.

Figure 3:
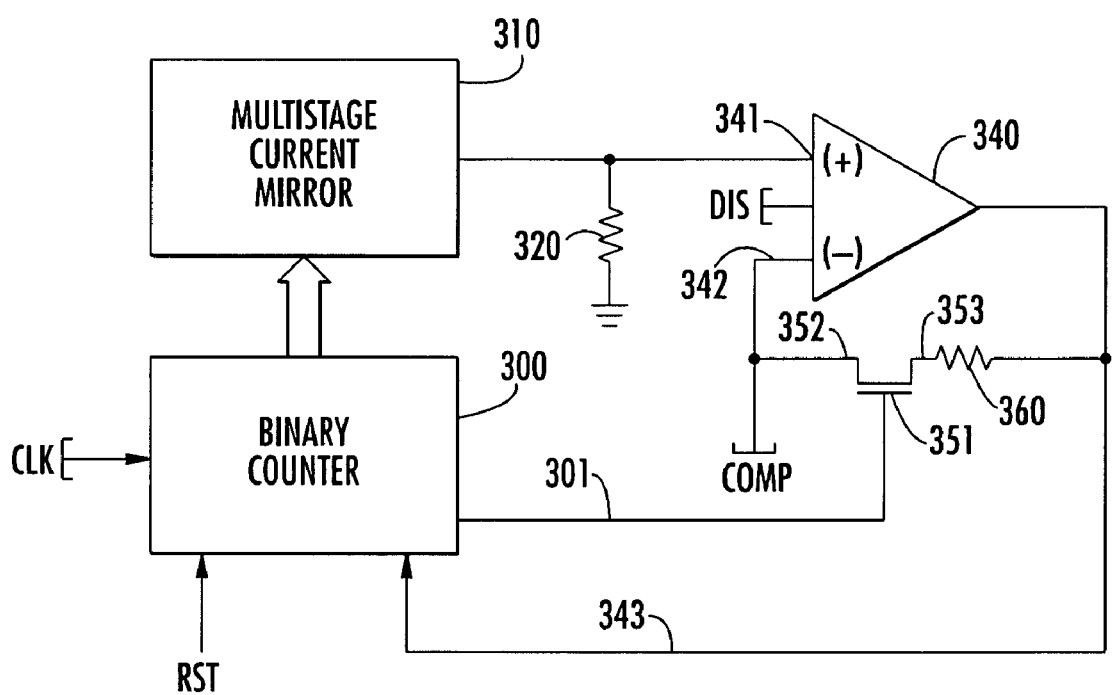
FIG. 3 diagrammatically illustrates the architecture of the sample and hold-based, voltage compensation circuit of FIG. 2.

Attention is now directed to FIG. 3, wherein the sample and hold-based, voltage compensation circuit 60 of FIG. 2 is diagrammatically illustrated as comprising a binary counter 300, that is sequentially incremented by a clock signal 'CLK' and is reset by reset signal 'RST' supplied by way of the converter's control circuitry. Outputs of respective stages of binary counter 300 are coupled to associated inputs of current mirror stages within a multistage current mirror 310, such as may be referenced to a bandgap voltage source.

The currents produced by multistage current mirror 310 are summed through a summing resistor 320, which is coupled to a first, non-inverting (+) input 341 of a 'compensation' differential amplifier 340. A second, inverting (−) input 342 of compensation amplifier 340 is coupled to a compensation pin COMP, which corresponds to the output node 13 of FIG. 2, to which the AC compensation filter 30 of error amplifier 10 is coupled. The respective stages of binary counter 300 are coupled by means of a set of combinational logic to the gate 351 of a sample and hold FET 350, which has its source-drain path 352–353 coupled in circuit with a resistor 360 installed in a feedback path of compensation amplifier 340. A disable input 'DIS' is coupled from control circuitry to the amplifier 340. The 'DIS' input is used to disable the amplifier in RUN mode; when the disable input 'DIS' is removed during SLEEP mode, amplifier 340 is enabled.

In operation, in response to a RUN-to-SLEEP mode transition of the power supply circuit, the disable input 'DIS' to compensation amplifier 340 is removed, as described above, and a reset input 'RST' is applied from the controller to the binary counter 300 to clear its contents. Counter 300 then begins being sequentially incremented by the clock signal 'CLK'. As the counter 300 is incremented, associated current mirror stages of the multistage current mirror 310 sequentially increment the amount of current being summed through resistor 320. When the magnitude of the currents summed through resistor 320 produce a voltage thereacross that equals the value of the compensation voltage $V_{comp}$ at the compensation node COMP, the output of amplifier 340 is tripped and changes state.

This change in state of the output of amplifier 340 is coupled to the counter 300 over link 343 to terminate operation of the counter and thereby effectively 'freeze' its count value. In response, counter 300 couples an output over link 301 to the gate of FET 350 to place amplifier 340 in a unity gain state, so that the voltage at the compensation pin COMP is maintained at its 'frozen' value. The compensation voltage $V_{comp}$ at the COMP node is maintained during SLEEP mode, and is thus immediately available to the PWM driver circuitry 20, so that the problem of charge bleed off from in the AC compensation RC filter 30 is obviated, and a smooth transition between SLEEP and RUN mode is afforded. When the converter returns to RUN mode, the disable input 'DIS' is again applied to amplifier 340, and the sample and hold circuitry becomes inactive, waiting for an assertion of SLEEP mode or operation, as described.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method for effecting a relatively smooth power supply switch-over during a transition from quiescent to active mode of operation of a DC—DC converter comprising the steps of:
   (a) in response to a transition in the operation of said DC—DC converter from run mode to quiescent mode, sampling and storing the voltage of an AC compensation filter as a compensation voltage for an error amplifier for said DC—DC converter; and
   (b) in response to a transition in the operation of said DC—DC converter from quiescent mode to run mode, coupling said compensation voltage to drive circuitry of said DC—DC converter.

2. The method according to claim 1, wherein said DC—DC converter comprises a pulse width modulation (PWM)-based DC—DC converter, and wherein said drive circuitry corresponds to PWM drive circuitry for said DC—DC converter.

3. The method according to claim 1, wherein step (a) comprises, in response to said run-to-sleep mode transition of said DC—DC converter incrementing the value of a comparison voltage, and in response to said comparison voltage equaling the voltage of said AC compensation filter, terminating said incrementing of the value of said comparison voltage, and maintaining said comparison voltage by means of a unity gain amplifier.

4. The method according to claim 3, wherein step (b) comprises, in response to said transition in the operation of said DC—DC converter from quiescent mode to run mode, coupling said comparison voltage maintained in step (a) as said compensation voltage to said drive circuitry of said DC—DC converter.

5. The method according to claim 3, wherein step (a) comprises, in response to said run-to-sleep mode transition of said DC—DC converter incrementing the value of a counter, coupling the contents of said counter to a current generator, said current generator producing an output current proportional to the count value of said counter, and coupling said output current to a summing resistor to realize said comparison voltage.

6. An apparatus effecting a relatively smooth power supply switch-over during a transition from quiescent to active mode of operation of a DC—DC converter comprising:

a sample and hold circuit, which is operative, in response to a transition in the operation of said DC—DC converter from run mode to quiescent mode, to sample and store the voltage of an AC compensation filter as a compensation voltage for an error amplifier for said DC—DC converter; and a compensation voltage coupling circuit, which is operative, in response to a transition in the operation of said DC—DC converter from quiescent mode to run mode, to apply said compensation voltage to drive circuitry of said DC—DC converter.

7. The apparatus according to claim 6, wherein said DC—DC converter comprises a pulse width modulation (PWM)-based DC—DC converter, and wherein said drive circuitry corresponds to PWM drive circuitry for said DC—DC converter.

8. The apparatus according to claim 6, wherein said sample and hold circuit comprises a comparison voltage generator, which is operative, in response to said run-to-sleep mode transition of said DC—DC converter, to produce an incrementally varied comparison voltage, and in response to said comparison voltage equaling the voltage of said AC compensation filter, to terminate incrementing of the value of said comparison voltage, and a unity gain amplifier which maintains said comparison voltage during sleep mode of said DC—DC converter.

9. The apparatus according to claim 8, wherein said compensation voltage coupling circuit is operative, in response to said transition in the operation of said DC—DC converter from quiescent mode to run mode, to couple said comparison voltage maintained by said unity gain amplifier as said compensation voltage to said drive circuitry of said DC—DC converter.

10. The apparatus according to claim 8, wherein said sample and hold circuit comprises a counter, the contents of which are successively incremented, in response to a run-to-sleep mode transition of said DC—DC converter, a current generator which is coupled to said counter and is operative to produce an output current proportional to the count value of said counter, and a summing resistor to which said output current is coupled to realize said comparison voltage.

11. In a DC—DC converter having an AC compensation filter coupled in circuit with an error amplifier to which a control voltage and a feedback voltage are supplied, the output of said error amplifier being coupled to drive circuitry for said DC—DC converter, the improvement comprising an arrangement for effecting a relatively smooth power supply switch-over during a transition from quiescent to active mode of operation of said DC—DC converter, by sampling and storing the voltage of an AC compensation filter as a compensation voltage for an error amplifier for said DC—DC converter, in response to a transition in the operation of said DC—DC converter from run mode to quiescent mode and, in response to a transition in the operation of said DC—DC converter from quiescent mode to run mode, coupling said compensation voltage to drive circuitry for said DC—DC converter.

12. The improvement according to claim 11, wherein said arrangement is operative, in response to said run-to-sleep mode transition of said DC—DC converter, to increment the value of a comparison voltage and, in response to said comparison voltage equaling the voltage of said AC compensation filter, to terminate incrementing of the value of said comparison voltage, and to maintain said comparison voltage by means of a unity gain amplifier.

13. The improvement according to claim 12, wherein said arrangement is operative, in response to said transition in the operation of said DC—DC converter from quiescent mode to run mode, to couple said comparison voltage as said compensation voltage to said drive circuitry of said DC—DC converter.

14. The improvement-according to claim 12, wherein said arrangement is operative, in response to said run-to-sleep mode transition of said DC—DC converter, to increment the value of a counter, and couple the contents of said counter to a current generator, said current generator producing an output current proportional to the count value of said counter, and to couple said output current to a summing resistor to realize said comparison voltage.

15. The improvement according to claim 11, wherein said DC—DC converter comprises a pulse width modulation (PWM)-based DC—DC converter, and wherein said drive circuitry corresponds to PWM drive circuitry for said DC—DC converter.

* * * * *